United States Patent [19]

Lenoir

[11] Patent Number: 4,575,482

[45] Date of Patent: Mar. 11, 1986

[54] PHOTOGRAPHIC SILVER DYE BLEACH MATERIALS CONTAINING FORMYL-SUBSTITUTED AZO COMPOUNDS AS IMAGE DYES

[75] Inventor: John Lenoir, Fribourg, Switzerland

[73] Assignee: Ciba-Geigy AG, Basel, Switzerland

[21] Appl. No.: 552,220

[22] Filed: Nov. 14, 1983

Related U.S. Application Data

[62] Division of Ser. No. 258,246, Apr. 28, 1981.

[30] Foreign Application Priority Data

Apr. 30, 1980 [CH] Switzerland ........................ 3343/80

[51] Int. Cl.[4] .................... C09B 29/085; C09B 31/043; G03C 5/44; C03C 5/52

[52] U.S. Cl. .................................... 430/431; 430/224; 430/225; 430/235; 430/236; 430/560; 534/770; 534/851; 534/829

[58] Field of Search ............... 430/431, 560, 561, 224, 430/225, 235, 236; 260/155, 207, 207.1, 187, 191; 534/851, 770, 829

[56] References Cited

U.S. PATENT DOCUMENTS

| | | | |
|---|---|---|---|
| 3,751,406 | 8/1973 | Bloom | 260/162 |
| 4,105,655 | 8/1978 | Gottschlich et al. | 260/207.1 |

*Primary Examiner*—Floyd D. Higel
*Attorney, Agent, or Firm*—Joseph G. Kolodny

[57] ABSTRACT

Photographic materials which comprise, on a base, at least one layer containing an azo dyestuff of the formula

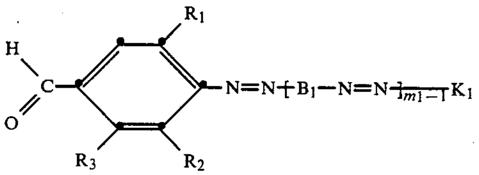

in which $R_1$ is hydrogen, an alkylsulfone, halogen, cyano or nitro, $R_2$ is hydrogen, halogen, cyano or nitro, $R_3$ is hydrogen, alkyl, halogen, cyano or nitro, $B_1$ is an aromatic ring system, $K_1$ is an aromatic amine and $m_1$ is 1 or 2.

10 Claims, No Drawings

PHOTOGRAPHIC SILVER DYE BLEACH MATERIALS CONTAINING FORMYL-SUBSTITUTED AZO COMPOUNDS AS IMAGE DYES

This is a division of application Ser. No. 258,246, filed Apr. 28, 1981.

The present invention relates to novel azo dyes, to processes for their preparation, and to the use of these compounds as image dyes in photographic silver dye bleach materials.

The invention provides azo dyes of the formula

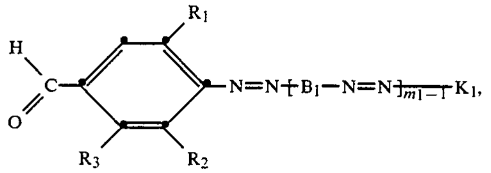
(1)

in which $R_1$ is hydrogen, substituted or unsubstituted alkylsulfone having 1 to 8 carbon atoms, halogen, cyano or nitro, $R_2$ is hydrogen, halogen, cyano or nitro, $R_3$ is hydrogen, substituted or unsubstituted alkyl having 1 to 4 carbon atoms, halogen or nitro, $B_1$ is a substituted or unsubstituted, homocyclic or heterocyclic, monocyclic or bicyclic, unsaturated ring system, $K_1$ is a substituted or unsubstituted, homocyclic or heterocyclic, monocyclic or bicyclic, aromatic amine radical and $m_1$ is 1 or 2.

The invention also provides a process for the preparation of the novel azo dyes.

The invention further provides the use of the novel azo dyes as image dyes in photographic silver dye bleach materials, the photographic material containing these dyes, and the photographic images produced with the material.

In addition to hydrogen, the substituent $R_1$ in compounds of the formula (1) can be alkylsulfone having 1 to 8, preferably 1 to 5, carbon atoms. The alkyl radical, for example methyl, ethyl, propyl, i-propyl, butyl, t-butyl, pentyl, i-pentyl, hexyl, heptyl or octyl, or isomers of these, can be substituted by, for example, methoxy, cyano or halogen, such as chlorine or bromine. $R_1$ can also be halogen, in which case chlorine and bromine are preferred. Furthermore, $R_1$ can be cyano or nitro.

The substituent $R_2$ is hydrogen, cyano, halogen, for example chlorine or bromine, or nitro.

$R_3$ can be hydrogen or alkyl having 1 to 4 carbon atoms, amongst which methyl and ethyl are preferred. $R_3$ can also be halogen, in which case chlorine and bromine are preferred. Further, $R_3$ can be nitro.

If $B_1$ is a homocyclic or heterocyclic, monocyclic or bicyclic, unsaturated ring system, preferred examples are phenylene, naphthylene, thiophenylene and thiazolylene; phenylene and naphthylene are particularly suitable. Substituents of these ring systems are $X_1$ and $Z_1$; accordingly, the preferred systems are

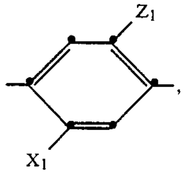
,
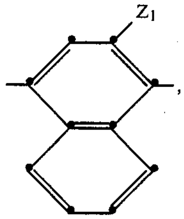
,

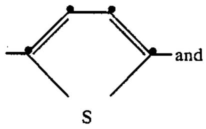
and
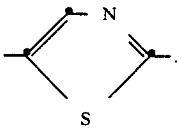
.

$X_1$ is alkyl or alkoxy, each having 1 to 6 carbon atoms. Suitable alkyl radicals are those mentioned for $R_1$. Suitable alkoxy radicals are derived from these alkyl radicals. These alkyl and alkoxy radicals can be substituted further, for example by hydroxyl, methoxy, chlorine, bromine, cyano or nitro. The preferred alkyl and alkoxy radicals are methyl, ethyl, methoxy and ethoxy.

$X_1$ can also be —NHCO—$V_1$, in which $V_1$ is alkyl having 1 to 14, especially 1 to 8, preferably 1 to 4, carbon atoms. Examples are the alkyl radicals mentioned for $R_1$, as well as nonyl, decyl, undecyl, dodecyl, tetradecyl and their isomers. The alkyl radicals can be substituted by halogen, preferably chlorine or bromine and especially fluorine, alkoxy having 1 to 4, especially 1 or 2, carbon atoms, carbalkoxy having 2 to 5 carbon atoms or phenoxy, which can itself also be substituted by alkyl having 1 to 5 carbon atoms, preferably in the para-position; an alkyl radical $V_1$ can also be substituted by radicals of the formula $—P(O)(OCH_3)_2$ or $—P(O)(OC_2H_5)_2$. Particularly suitable ligands are halogen, methoxy or ethoxy. $V_1$ can also be alkoxy having 1 to 4 carbon atoms.

$X_1$ can also be $—NHP(O)(OT_1)_2$, in which $T_1$ is alkyl having 1 to 8, especially 1 to 4 carbon atoms. Examples of suitable alkyl radicals have been given above. The alkyl radicals may be substituted by methoxy or ethoxy. $T_1$ can also be phenyl or benzyl.

$X_1$ can also be alkylsulfonylamino ($—NHSO_2$-alkyl), in which the alkyl moiety has 1 to 8, especially 1 to 6, carbon atoms. Examples of suitable alkyl radicals have been given above. The substituent $Z_1$ is hydrogen or alkoxy having 1 to 6 carbon atoms, methoxy and ethoxy being preferred.

The substituent $K_1$ is a homocyclic or heterocyclic, monocyclic or bicyclic, aromatic amine radical. Examples of suitable radicals are

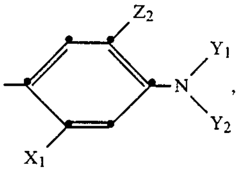
,
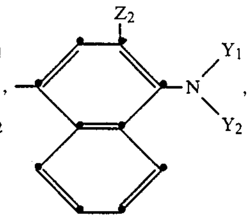
,

-continued

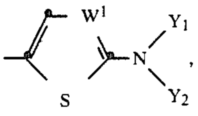
,
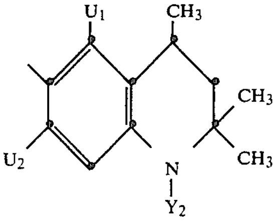
and
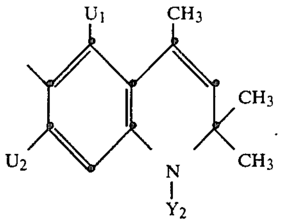

In these formulae, $U_1$ and $U_2$ are, independently of one another, hydrogen, alkyl or alkoxy each having 1 to 4, especially 1 or 2, carbon atoms, or —NHCO—A, in which A is alkyl having 1 to 6, especially 1 to 4, carbon atoms, or is phenyl. The alkyl radicals A can be substituted by methoxy, ethoxy or butoxy or by carbalkoxy having 2 or 3 carbon atoms. One of the substituents $U_1$ and $U_2$ must always be hydrogen. The preferred meanings of $U_1$ and $U_2$ are hydrogen and —NHCO—A.

$W^1$ is —CH= or —N=.

$X_1$ is as defined above.

$Y_1$ is hydrogen or alkyl having 1 to 5 carbon atoms. Examples of suitable alkyl radicals have been given above. The alkyl radicals can be further substituted by halogen, especially chlorine, cyano, methoxy or hydroxyl.

$Y_2$ can be hydrogen or alkyl of 1 to 12, especially of 1 to 8, carbon atoms, or alkoxyalkyl of 2 to 12, especially 2 to 8, carbon atoms. Suitable alkyl radicals are mentioned above. The alkyl moieties of the alkoxyalkyl groups are also as listed above, and the alkoxy moieties are derived from the alkyl radicals listed above. The stated number of 2 to 12 carbon atoms is the sum of the carbon atoms of the alkyl moiety and alkoxy moiety. The alkyl radicals and alkoxyalkyl radicals can be substituted by methoxy, chlorine, bromine, cyano or hydroxyl. $Y_2$ can also be alkenyl having 2 to 4 carbon atoms, benzyl or phenyl, and the last-mentioned can be substituted, preferably in the para-position, by alkyl having 1 to 5 carbon atoms.

The substituent $Z_2$ is hydrogen or alkoxy having 1 to 6, especially 1 to 4, carbon atoms, perefably methoxy. The alkoxy radical can be substituted by halogen, for example chlorine or bromine, or by methoxy. $Z_2$ can also be the atoms which together with $Y_1$ form a 5-membered or preferably 6-membered saturated or unsaturated ring. Such rings can be substituted by, for example, methyl, formyl, acetyl or carbomethoxy.

$m_1$ is 1 or 2.

Preferred compounds are those of the formula

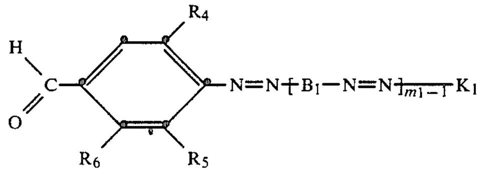
(2)

in which $R_4$ is hydrogen, substituted or unsubstituted alkylsulfone having 1 to 6 carbon atoms, chlorine, bromine, cyano or nitro, $R_5$ is hydrogen, chlorine, bromine, cyano or nitro, $R_6$ is hydrogen, methyl, ethyl, chlorine, bromine or nitro and $B_1$, $K_1$ and $m_1$ have the stated meanings.

Particularly suitable compounds of the formula (2) are those of the formula

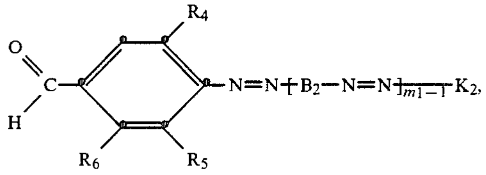
(3)

in which $B_2$ is one of the ring systems

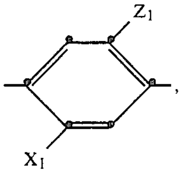
,
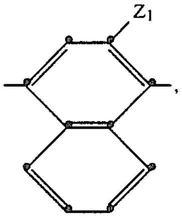
,
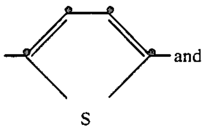
and
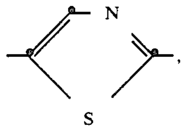
, in which $X_1$ is substituted or unsubstituted alkyl or alkoxy, each having 1 to 6 carbon atoms, substituted or unsubstituted alkylsulfonylamino having 1 to 8 carbon atoms, or —NHCO—$V_1$, in which $V_1$ is substituted or unsubstituted alkyl having 1 to 14 carbon atoms or alkoxy having 1 to 4 carbon atoms, or $X_1$ is —NHP(O)-$(OT_1)_2$, in which $T_1$ is substituted or unsubstituted alkyl having 1 to 8 carbon atoms, benzyl or phenyl, $Z_1$ is hydrogen or substituted or unsubstituted alkoxy having 1 to 6 carbon atoms, $K_2$ is

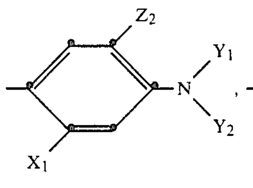
,
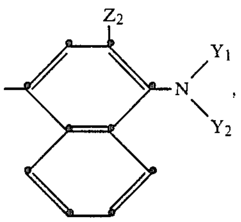
,

-continued

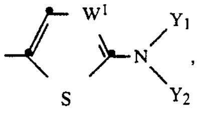, 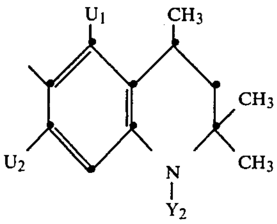 or

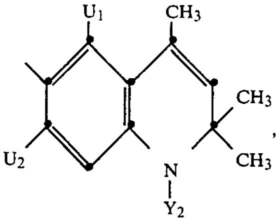, in which $U_1$ and $U_2$ are hydrogen, substituted or unsubstituted alkyl or alkoxy each having 1 to 4 carbon atoms, or —$NHCOA_1$, in which $A_1$ is alkyl having 1 to 4 carbon atoms or phenyl, and at least one of the substituents $U_1$ and $U_2$ must always be hydrogen, $W^1$ is —CH= or —N=, $Y_1$ is hydrogen or substituted or unsubstituted alkyl having 1 to 5 carbon atoms, $Y_2$ is hydrogen, substituted or unsubstituted alkyl having 1 to 12 carbon atoms or alkoxyalkyl having 2 to 12 carbon atoms, alkenyl having 2 to 4 carbon atoms, benzyl or substituted or unsubstituted phenyl, $Z_2$ is hydrogen or substituted or unsubstituted alkoxy having 1 to 6 carbon atoms or stands for the atoms which together with $Y_1$ form a 5-membered or 6-membered, saturated or unsaturated, substituted or unsubstituted ring, and $X_1$, $m_1$, $R_4$, $R_5$ and $R_6$ are as defined above.

Preferred compounds have the formula

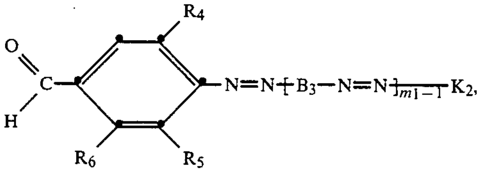 (4)

in which $B_3$ is

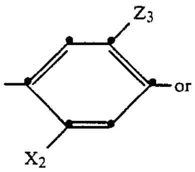 or 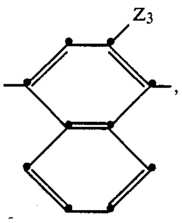, in which $X_2$ is alkyl or alkoxy, each having 1 or 2 carbon atoms, or is —$NHCOV_2$, in which $V_2$ is alkyl having 1 to 14 carbon atoms or alkoxy having 1 to 4 carbon atoms which can be substituted by halogen, by alkoxy having 1 to 4 carbon atoms, by —$P(O)(OC_2H_5)_2$, by carbalkoxy having 2 to 5 carbon atoms, by phenoxy or by alkyl-substituted phenoxy, alkyl having 1 to 5 carbon atoms, or $X_2$ is alkylsulfonylamino having 1 to 6 carbon atoms or is —$NHP(O)(OT_1)_2$, in which $T_1$ is as defined above, $Z_3$ is hydrogen, methoxy or ethoxy and $m_1$, $K_2$, $R_4$, $R_5$ and $R_6$ are as defined above.

Further suitable compounds are those of the formula

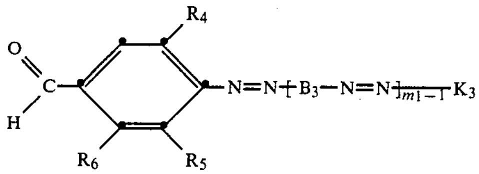 (5)

in which $K_3$ is

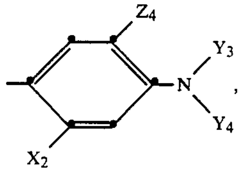,

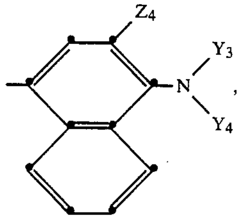,

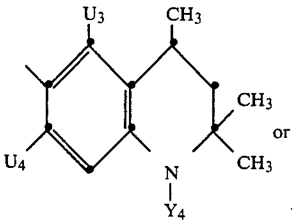 or

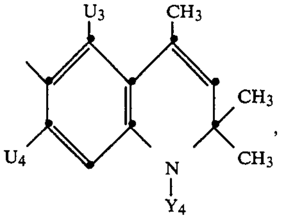, in which $U_3$ and $U_4$ are hydrogen or —$NHCOA_2$, in which $A_2$ is alkyl having 1 to 4 carbon atoms, or are alkyl or alkoxy each having 1 to 4 carbon atoms, but at least one of the substituents $U_3$ and $U_4$ must always be hydrogen, $Y_3$ is hydrogen or alkyl having 1 to 4 carbon atoms, $Y_4$ is hydrogen, alkyl having 1 to 8 carbon atoms, alkoxyalkyl having 2 to 8 carbon atoms, benzyl or phenyl, $Z_4$ is hydrogen or alkoxy having 1 to 4 carbon atoms or stands for the atoms which together with $Y_3$ form a 6-membered, saturated or unsaturated, methyl-substituted ring and $X_2$, $R_4$, $R_5$, $R_6$ and $m_1$ are as defined above.

Valuable compounds are those of the formula

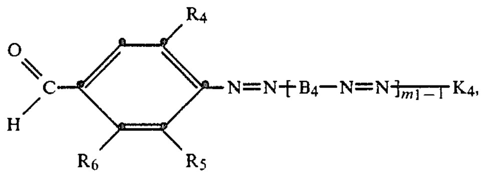
(6)

in which $B_4$ is

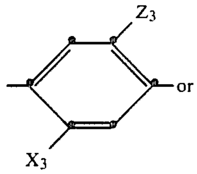
or
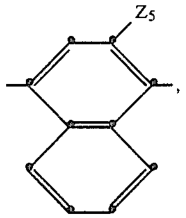
, in which $X_3$ is alkyl or alkoxy, each having 1 or 2 carbon atoms, or is —$NHCOV_3$, in which $V_3$ is alkyl having 1 to 8 carbon atoms, which can be substituted by fluorine, by alkoxy having 1 to 4 carbon atoms, by —P(O)$(OC_2H_5)_2$, by carbalkoxy having 2 to 5 carbon atoms, by phenoxy or by alkyl-substituted phenoxy, the alkyl moiety having 1 to 5 carbon atoms, or $X_3$ is alkylsulfonylamino having 1 to 6 carbon atoms or is —NH-P(O)$(OT_2)_2$, in which $T_2$ is unsubstituted or methoxy- or ethoxy-substituted alkyl having 1 to 4 carbon atoms or is phenyl, $Z_5$ is hydrogen or methoxy, $K_4$ is

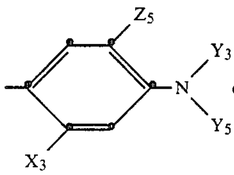
or
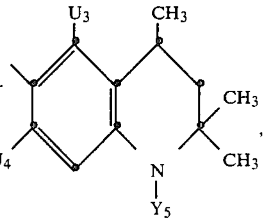
, in which Y is hydrogen, alkyl having 1 to 4 carbon atoms or alkoxyalkyl having 2 to 4 carbon atoms and $X_3$, $Z_5$, $U_3$, $U_4$, $Y_3$, $R_4$, $R_5$, $R_6$ and $m_1$ are as defined above.

Further useful compounds are those of the formula

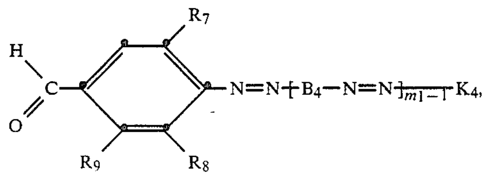
(7)

in which $R_7$ is hydrogen, alkylsulfone having 1 to 4 carbon atoms, cyano or nitro, $R_8$ is chlorine, bromine, cyano or nitro, $R_9$ is hydrogen or methyl and $B_4$, $K_4$ and $m_1$ are as defined above.

Particularly useful compounds are those of the formula

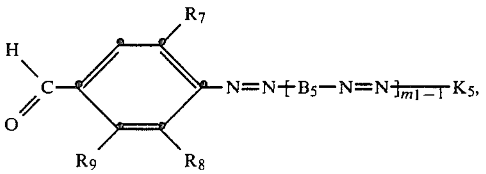
(8)

in which $B_5$ is

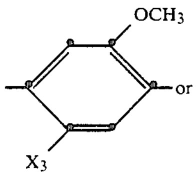
or
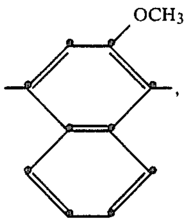
, in which $X_3$ is as defined above, $K_5$ is

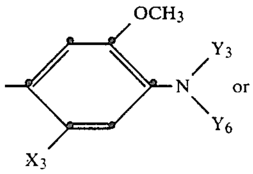
or
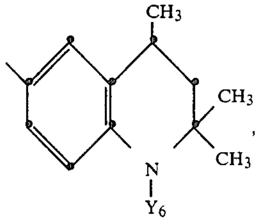
, in which $X_3$ and $Y_3$ are as defined above and $Y_6$ is hydrogen or alkyl having 1 to 4 carbon atoms, and $R_7$, $R_8$, $R_9$ and $m_1$ are as defined above.

Particularly preferred compounds are those of the formula

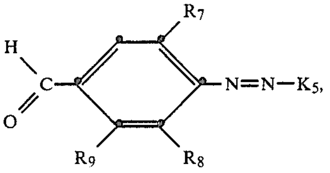
(9)

in which $R_7$, $R_8$, $R_9$ and $K_5$ are as defined above.

Especially useful compounds of the formula (9) are those of the formulae

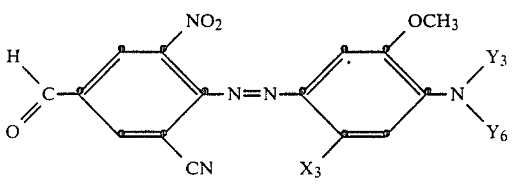
(10)

and

-continued

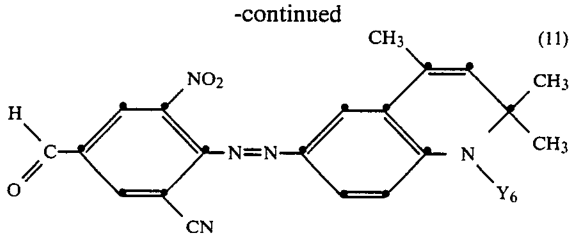

(11)

in which $X_3$, $Y_3$ and $Y_6$ are as defined above.

The compounds of the formulae (1) to (11) are prepared by diazotising a compound of the formula

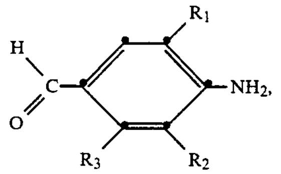

(12)

in which $R_1$, $R_2$ and $R_3$ are as defined above, and then coupling the product with a compound of the formula $$H-K_1 \quad (13)$$

in which $K_1$ is as defined above.

In an embodiment of this process, for the preparation of disazo dyes of the formula (1), in which $m_1$ is 2, the compound (12) is diazotised and reacted with a coupling component of the formula $$H-B_1-NH_2 \quad (14)$$

in which $B_1$ is as defined above and the product is then diazotised again, and reacted with the coupling component of the formula $$H-K_1 \quad (13)$$

in which $K_1$ is as defined above, to give the disazo dye.

The dyes of the formula (1) can be used for various purposes, but especially in photographic materials and in that case more particularly as image dyes for the silver dye bleach process. The oil-dissolved compounds of the formulae (1) to (13) exhibit a plurality of advantages. Thus, they are distinguished by high stability of their emulsions. The tendency to form micelles is completely absent, and accordingly neither the rheological properties of the coating solution nor the colour density of the photographic images are adversely affected.

The oil not only acts as a solvent for the dyes but can at the same time serve as a plasticiser for the gelatin. This substantially prevents the detachment of the photographic layers from the base, which can occur particularly under moist conditions.

As a result of the good solubility of the dyes in oil, a large amount of dye can be taken up in one droplet of oil. Consequently, photographic materials can be coated with very thin layers. This has an advantageous effect on the sharpness of the image.

Because of their insolubility in water, the dyes can be isolated in a very pure form. Accordingly, valuable photographic materials, especially silver dye bleach materials, which comprise, on a base, at least one layer containing a dye of the formula (1), can be prepared in a conventional manner known per se.

A transparent, metallically reflecting or, preferably, opaque white material can be used as the base for the silver halide emulsion layers; preferably, the base should not be capable of absorbing liquid from the baths.

The base can consist, for example, of unpigmented or pigmented cellulose triacetate or polyester. Should it consist of paper fibres, it must be lacquered or polyethylene-coated, on both sides. On at least one side of this base are the light-sensitive layers, preferably in the conventional arrangement, i.e. a red-sensitised silver halide emulsion layer, containing a cyan azo dye, as the lowest layer, on top of this a green-sensitised silver halide emulsion layer containing a magenta azo dye, and, as the uppermost layer, a blue-sensitive silver halide emulsion layer containing a yellow azo dye. The material can also contain subbing layers, intermediate layers, filter layers and protective layers, but the total thickness of the layers should as a rule not exceed 20μ.

The dyes according to the invention are lipophilic and are in general incorporated into the gelatins as solutions in high-boiling solvents. In most cases it suffices to add the dyes employed as a solution in such a solvent, with or without the addition of a volatile auxiliary solvent, to an aqueous gelatin solution at normal or slightly elevated temperature, with efficient stirring. The mixture is then brought together with a gelatin which contains silver halide and/or other materials for producing photographic images, coated on a base in a conventional manner to form a layer, and dried if appropriate.

Dyes of the formula (1), dissolved in organic solvents, can also be added direct to a gelatin which contains silver halide and/or other materials for producing photographic images. Thus, for example, it is possible to add the dye solution only immediately prior to coating.

Instead of simple stirring, the conventional methods of dispersing by means of kneading forces and/or shearing forces or ultrasonics can also be employed.

It is also possible to incorporate the dye, as such or together with solvents, into the casting solution in accordance with the process described in Swiss Patent Application No. 4503/79-2, with formation of a spontaneous emulsion.

It is also possible to add the dye in a solid form, or as a paste, instead of as a solution. Furthermore, it is possible to incorporate the dyes into the gelatin in the presence of high-molecular polymers. Latices are particularly useful for this application.

The coating solution can also contain other additives, such as hardeners, complexing agents and wetting agents, as well as sensitisers and stabilisers for the silver halide.

The dyes of the formula (1) do not undergo any chemical reactions with the light-sensitive materials. They are very diffusion-resistant, because they form stable, organic solutions. They are insensitive to calcium ions and easily bleachable to white.

On addition to the coating solutions, the dyes produce neither an increase in viscosity nor a significant change in viscosity when the coating mixture is left to stand.

The spectral absorptions in gelatin are such that the dyes of the formula (1) can, if appropriate structures are chosen, be combined to form a dye tripack, composed of one yellow dye, one magenta dye and one cyan dye, the tripack showing grey shades, appearing neutral to the eye, over the entire density range.

The photographic silver dye bleach material containing dyes of the formula (1) is in particular distinguished by brilliant colours, good colour reproduction and excellent light-fastness. An important characteristic of a good colour-copying material is excellent tone rendition and balanced colour gradations in all density ranges. The control of the colour equilibrium, in particular, repeatedly presents difficulties, since different bleaching characteristics of the azo dyes cannot always be compensated by the conventional methods of building up the material, such as balancing the sensitivity and contrast of the silver emulsions employed. This in many cases restricts the choice of the image dyes, and in particular also the choice of processing components in the bleaching bath.

In general, the exposed silver dye bleach materials are processed in four successive steps:

1. silver development
2. dye bleaching
3. silver bleaching
4. fixing

In the first step, the latent silver image formed on exposure is developed. In the second step, the image dye allotted to the silver is bleached, in accordance with the existing image-wise distribution of the silver. The third step is necessary in order to re-oxidise the excess image silver still present after dye bleaching. In the fourth step, the silver, which is now entirely present in the form of halides, is removed by dissolving out with a complexing agent, especially a salt of thiosulfuric acid, in order to make the finished image insensitive to additional exposure and to free the pure colour image from cloudiness.

The second process step, namely dye bleaching, is carried out, in the conventional known processes, in a strongly acid medium, a catalyst being added to accelerate the dye bleaching. The bleaching baths additionally contain a silver complexing agent or ligand. Both the constituents, namely catalyst and ligand, are necessary in order to transmit the reducing action of the metallic, non-diffusible image silver to the equally non-diffusible dye. The reduced form of the catalyst, which is formed by reduction at the image silver, here serves as an intermediate carrier, which, after travelling a certain diffusion distance, irreversibly reduces, and thereby bleaches, the dye, and is at the same time itself re-oxidised to the original form.

The ability of the reduced stage of the bleaching catalyst to diffuse freely between the image silver and the dye to be bleached makes it possible spatially to separate the silver and the image dye to a certain degree, i.e. the bleachable dye and the corresponding silver halide emulsion need not be present in the same layer but can be in adjacent layers, or need only partially be present in the same layer. Such silver dye bleach materials are described, for example, in German Offenlegungsschriften Nos. 2,036,918, 2,132,835 and 2,132,836.

A simplification of the processing method, in which the dye bleaching and silver bleaching are combined in a single process step, has been described in German Offenlegungsschrift No. 2,448,433.

The combined dye bleach and silver bleach baths (i.e. the formulations) for processing the exposed silver dye bleach material contain components (a) to (e) below, with or without component (f): (a) strong acid, (b) water-soluble iodide, (c) water-soluble oxidising agent, (d) antioxidant, (e) bleaching catalyst and (f) bleaching accelerator.

The amount of the bleaching catalysts which are employed in the—preferably aqueous—processing baths can vary within wide limits and is about 0.05 to 10 g/l of bleaching bath.

The temperature of the bleaching bath is in general between 20° and 90° C., preferably between 20° and 60° C.; of course, the requisite processing time is less at a higher temperature than at a lower temperature. The bleaching baths are stable within the stated temperature range. In general, the aqueous bleaching formulations required for the processing operation are employed in the form of dilute aqueous solutions, containing the stated components. Other methods, for example use of the formulation in paste form, are however also conceivable.

The stated temperature range also applies to the other processing steps. The aqueous bleaching formulation according to the present invention can be prepared, for example, from liquid, in particular aqueous, concentrates of some or all components ((a) to (f)). It is advantageous to use, for example, two liquid concentrates, of which one contains the strong acid (a) and the oxidising agent (c) and the other contains the remaining components (b), (d) and (e), with or without (f); in the latter concentrate, an additional solvent, such as ethyl alcohol, propyl alcohol, benzyl alcohol, ethylene glycol methyl ether or ethylene glycol ethyl ether, can be added to improve the solubility, especially of component (e). As a rule, the aqueous bleaching formulations used contain components (a) to (f) in the following amounts:

(a) strong acid: 10 to 200 g/l;
(b) water-soluble iodide: 2 to 50 g/l, preferably 5 to 25 g/l;
(c) water-soluble oxidising agent: 1 to 30 g/l;
(d) antioxidant: 0.5 to 10 g/l;
(e) bleaching catalysts: 0.05 to 10 g/l, with or without
(f) bleaching accelerator: 1 to 5 g/l.

Strong acids (component (a)) which can be present in the combined dye bleaching and silver bleaching baths are alkylsulfonic acids or arylsulfonic acids, and especially p-toluenesulfonic acid, as well as sulfuric acid, sulfamic acid or trichloroacetic acid. Mixtures of these acids can also be employed. The pH value of the bleaching bath is in particular not greater than 2 and preferably not greater than 1.

The water-soluble iodides (component (b)) are as a rule alkali metal iodides, especially sodium iodide and potassium iodide.

The oxidising agents (c) employed are advantageously water-soluble aromatic mononitro and dinitro compounds and anthraquinonesulfonic acid derivatives. The use of such oxidising agents serves to influence the colour equilibrium and the contrast of the images produced by the dye bleach process and is known from German Pat. No. 735,672, British Pat. Nos. 539,190 and 539,509 and Japanese Patent Publication No. 22673/69.

The mononitro and dinitro compounds are preferably mononitrobenzenesulfonic acids or dinitrobenzenesulfonic acids, for example those of the formula

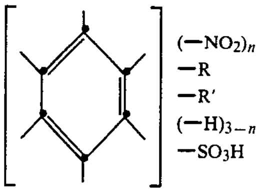

(14)

in which n is 1 or 2 and R and R' are hydrogen, lower alkyl having 1 to 4 carbon atoms, alkoxy, hydroxyl, amino or halogen (chlorine or bromine). The sulfonic acids can be added as readily soluble salts. Examples of suitable salts are the sodium or potassium salts of the following acids: o-nitrobenzenesulfonic acid, m-nitrobenzenesulfonic acid, 2,4-dinitrobenzenesulfonic acid, 3,5-dinitrobenzenesulfonic acid, 3-nitro-4-chlorobenzenesulfonic acid, 2-chloro-5-nitrobenzenesulfonic acid, 4-methyl-3,5-dinitrobenzenesulfonic acid, 3-chloro-2,5-dinitrobenzenesulfonic acid, 2-amino-4-nitrobenzenesulfonic acid, 2-amino-4-nitro-5-methoxybenzenesulfonic acid and 4-nitrophenol-2-sulfonic acid.

The compounds constituting component (c) serve not only as silver bleaching agents but also to produce a flatter gradation.

The antioxidants (anti-corrosion agents (d)) used are advantageously reductones or water-soluble mercapto compounds. Suitable reductones are, in particular, acireductones which have a 3-carbonylene-1,2-diol grouping, such as reductin, triose-reductone or, preferably, ascorbic acid. Examples of suitable mercapto compounds include thioglycerol, but especially the compounds of the formula $$HS—C_qH_{2q}—B \quad (15)$$

or preferably $$HS—(CH_2)_m—COOH \quad (16)$$

in which q is an integer from 2 to 12, B is a sulfonic acid group or carboxylic acid group and m is 3 or 4. Mercapto compounds which can be used as antioxidants are described in German Pat. No. 2,258,076 and German Pat. No. 2,423,814. Other suitable antioxidants are adducts of alkali metal bisulfites, alkaline earth metal bisulfites or ammonium bisulfites with organic carbonyl compounds, preferably adducts of alkali metal bisulfites or ammonium bisulfites with monoaldehydes having 1 to 4 carbon atoms or dialdehydes having 2 to 5 carbon atoms (German Pat. No. 2,737,142).

Examples include the formaldehyde-bisulfite adduct, which is particularly preferred, and also the corresponding adducts of acetaldehyde, propionaldehyde, butyraldehyde, isobutyraldehyde, glyoxal, malonodialdehyde or glutarodialdehyde. In some cases, the tertiary water-soluble phosphines referred to later as bleaching accelerators can at the same time serve as antioxidants.

Examples of suitable bleaching accelerators (f) are quaternary ammonium salts, such as are known from German Offenlegungsschriften Nos. 2,139,401 and 2,716,136. Preferably, they are quaternary, substituted or unsubstituted piperidine, piperazine, pyrazine, quinoline or pyridine compounds, the last-mentioned being preferred. Tetraalkylammonium compounds (alkyl having 1 to 4 carbon atoms) and alkylenediammonium compounds (alkylene having 2 to 6 carbon atoms) may also be used. Specific examples are: tetraethylammonium iodide; $(CH_3)_3N^{\oplus}(CH_2)_2N^{\oplus}(CH_3)_3.2I^{\ominus}$; $(CH_3)_3N^{\oplus}(CH_2)_6N^{\oplus}(CH_3)_3.2I^{\ominus}$; N-methylpyridinium iodide; N-methylquinolinium iodide; N-hydroxyethylpyridinium chloride; N-hydroxypropylpyridinium bromide; N-methyl-2-hydroxymethylpyridinium iodide; N,N-dimethylpiperidinium iodide; N,N'-dimethylpyrazinium fluosulfate and γ-picolinium bisulfate.

Other bleaching accelerators are the water-soluble tertiary phosphines known from German Offenlegungsschrift No. 2,651,969, which preferably contain at least one cyanoethyl grouping. They have, for example, the formula

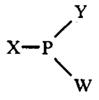

(17)

in which W is $—C_rH_{2r}CN$, $—C_rH_{2r}NO_2$ or a substituted or unsubstituted aryl radical or a heterocyclic radical, r is from 1 to 25, X is unsubstituted or substituted alkyl and Y is hydroxyalkyl, alkoxyalkyl, sulfoalkyl or aminoalkyl (alkyl in each case having 1 to 25, preferably 2 to 4, carbon atoms), phenyl, sulfophenyl or pyridyl. Preferred tertiary phosphines have the formula

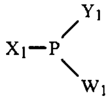

(18)

in which $X_1$ is $—CH_2CH_2CN$ or $—(CH_2)_2OCH_3$, $Y_1$ is $—(CH_2)_2SO_3^{\ominus}M^{\oplus}$, $—(CH_2)_3—SO_3^{\ominus}M^{\oplus}$, $—(CH_2)_4—SO_3^{\ominus}M^{\oplus}$, $—(CH_2)_2OCH_3$ or $—CH_2N(C_2H_5)_2$, $W_1$ is $—CH_2CH_2CN$ or phenyl and $M^{\oplus}$ is a cation, especially an alkali metal cation, for example the sodium or potassium cation.

Specific examples are the following compounds: the sodium salt of bis-(β-cyanoethyl)-2-sulfoethylphosphine, the sodium salt of bis-(β-cyanoethyl)-3-sulfopropylphosphine, the sodium salt of bis-(β-cyanoethyl)-4-sulfobutylphosphine, bis-(β-cyanoethyl)-2-methoxyethylphosphine, bis-(2-methoxyethyl)-(β-cyanoethyl)-phosphine, the sodium salt of (β-cyanoethyl)-phenyl-3-sulfopropylphosphine, (β-cyanoethyl)-phenyl-2-methoxyethylphosphine and bis-(2-methoxyethyl)-phenylphosphine.

All baths can contain additional conventional additives, for example hardeners, wetting agents, fluorescent brighteners or ultraviolet stabilisers.

For the silver development, baths of conventional composition can be employed, for example those which contain hydroquinone as the developer substance, with or without 1-phenyl-3-pyrazolidinone. The silver development bath can also already contain a bleaching catalyst.

The silver fixing bath can be made up in a known conventional manner. The fixing agent used is, for example, sodium thiosulfate or, advantageously, ammonium thiosulfate, optionally together with additives such as sodium bisulfite and/or sodium metabisulfite.

EXAMPLE 1

Preparation of the dye of the formula

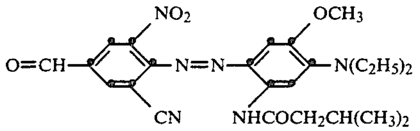

0.74 g (0.003 mol) of 4-amino-3-bromo-5-nitrobenzaldehyde are suspended in 15 ml of acetonitrile in the presence of 0.3 ml of methanesulfonic acid. The mixture is cooled to 5° C. and 0.4 g of nitrosylsulfuric acid is added. This mixture is stirred at 15° C. for 25 minutes and 0.83 g of N,N-diethyl-2-methoxy-5-isovalerylamidoaniline in 5 ml of acetonitrile are then added. The mixture is diluted with 50 ml of ice water, buffered with sodium acetate and stirred for 90 minutes. The precipitate is filtered off and suspended in 40 ml of acetonitrile. The violet dye is filtered off with suction, and dried in vacuo.

1.1 g (69%) of the intermediate of the formula

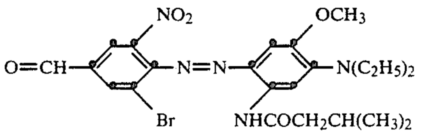

are obtained.

This intermediate is heated with 0.25 g of copper(I) cyanide in 25 ml of N-methyl-pyrrolidone at 60° C., under nitrogen, for 2 hours.

The mixture is then poured into water and the blue precipitate is filtered off. The crude dye is dissolved in methylene chloride and the solution is washed twice with 40% ammonium thiocyanate solution and then with water, after which the solvent is evaporated off. The residue is recrystallised from acetonitrile.

0.7 g (70%) of a cyan dye having the following physical data is obtained: melting point 181°-183° C.; $\gamma_{max}^{CHCl_3}=636$ nm ($\epsilon=79740$).

The dyes of the formula (100)

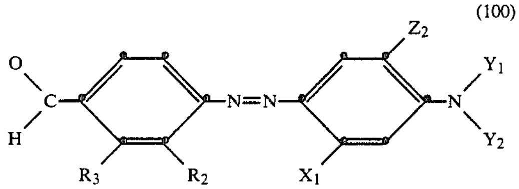

which are listed in Table 1, and the dyes of the formula (100a)

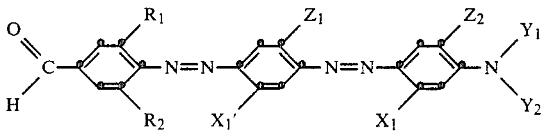

which are listed in Table 2 are prepared in a similar manner.

TABLE 1

| No. | $X_1$ | $Y_2$ | $Y_1$ | $Z_2$ | $R_2$ | $R_3$ | $R_1$ | $CHCl_3$ max | $\epsilon_{mol}$ | $\lambda_{max}^{Gel}$ |
|---|---|---|---|---|---|---|---|---|---|---|
| 101 | $NHCOCH_2CH(CH_3)_2$ | $C_2H_5$ | $C_2H_5$ | $OCH_3$ | Br | H | Br | 515 | 26090 | 523 |
| 102 | " | " | " | $OCH_3$ | CN | H | $NO_2$ | 636 | 76020 | 636 |
| 103 | $NHCOCH(C_2H_5)C_4H_9$ | $C_4H_9$ | $C_4H_9$ | $OCH_3$ | CN | H | $NO_2$ | 641 | 81670 | 637 |
| 104 | " | $C_2H_5$ | $C_2H_5$ | $OCH_3$ | CN | H | $NO_2$ | 637 | 74530 | 636 |
| 105 | $NHCOCH(CH_3)_2$ | $C_4H_9$ | $C_4H_9$ | $OCH_3$ | CN | H | CN | 644 | 84560 | 642 |
| 106 | $NHCO(CH_2)_3CO_2C_2H_5$ | $C_2H_5$ | $C_2H_5$ | $OCH_3$ | CN | H | $NO_2$ | 637 | 73100 | 636 |
| 107 | $NHCOC_2H_4OCH_2CH(CH_3)_2$ | " | " | $OCH_3$ | CN | H | $NO_2$ | 627 | 78800 | 634 |
| 108 | $NHCOC_7F_{15}$ | " | " | $OCH_3$ | CN | H | CN | 639 | 87520 | 639 |
| 109 | 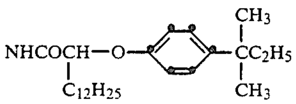 | " | " | $OCH_3$ | CN | H | $NO_2$ | 634 | 58330 | 627 |
| 110 | $NHPO(OC_2H_5)_2$ | $CH(CH_3)CH_2OCH_3$ | H | $OCH_3$ | $NO_2$ | H | H | 551 | 39350 | 550 |
| 111 | " | $C_2H_5$ | $C_2H_5$ | $OCH_3$ | CN | H | CN | 631 | 81320 | 630 |
| 112 | $NHPO(OC_4H_9)_2$ | $C_2H_4CN$ | H | H | H | H | H | 435 | 28220 | 471 |
| 113 | $NHPO(OC_4H_9)_2$ | $CH(CH_3)CH_2OCH_3$ | H | $OCH_3$ | $NO_2$ | H | H | 550 | 42530 | 550 |
| 114 | " | $C_2H_5$ | $C_2H_5$ | $OCH_3$ | CN | H | CN | 631 | 85600 | 631 |
| 115 | " | " | $C_2H_5$ | $OCH_3$ | CN | H | $NO_2$ | 629 | 71110 | 626 |
| 116 | $NHPO(OC_6H_5)_2$ | $C_4H_9$ | $C_4H_9$ | $OCH_3$ | CN | H | CN | 634 | 82990 | 632 |
| 117 | $NHPO(OC_2H_4OC_2H_5)_2$ | $C_2H_5$ | $C_2H_5$ | $OCH_3$ | CN | H | $NO_2$ | 630 | 69030 | 627 |
| 118 | $NHPO(OC_8H_{17})_2$ | " | " | $OCH_3$ | CN | H | $NO_2$ | 630 | 73810 | 626 |
| 119 | $NHSO_2C_6H_{13}$ | " | " | $OCH_3$ | CN | H | $NO_2$ | 635 | 62660 | 621 |
| 120 | $NHCOCH(C_2H_5)C_4H_9$ | $CH_2CH(CH_3)_2$ | $CH_2CH(CH_3)_2$ | $OCH_3$ | CN | H | $NO_2$ | 642 | 65670 | 636 |
| 121 | $NHCOC_2H_5$ | $C_2H_5$ | $C_2H_5$ | $OC_2H_4OCH_3$ | CN | H | $NO_2$ | 637 | 79910 | 635 |
| 122 | $NHCOCH_2CH(CH_3)_2$ | $C_4H_9$ | $C_4H_9$ | $OCH_3$ | CN | H | $NO_2$ | 640 | 78910 | 635 |
| 123 | $NHCOC_2H_4\underset{\underset{O}{\|}}{P}(OC_2H_5)_2$ | $C_2H_5$ | $C_2H_5$ | $OCH_3$ | CN | H | $NO_2$ | 636 | 74900 | 633 |

TABLE 1-continued

| No. | $X_1$ | $Y_2$ | $Y_1$ | $Z_2$ | $R_2$ | $R_3$ | $R_1$ | $CHCl_3$ max | $\epsilon_{mol}$ | $\lambda_{max}^{Gel}$ |
|---|---|---|---|---|---|---|---|---|---|---|
| 124 | $NHCOCH_2CH(CH_3)_2$ | $C_2H_5$ | 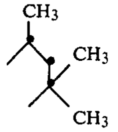 | | $NO_2$ | H | CN | 617 | 70870 | 614 |

TABLE 2

| No. | $X_1$ | $Z_2$ | $Y_1$ | $Y_2$ | $X_1'$ | $Z_1$ | $R_1$ | $R_2$ | $\lambda_{max}^{CHCl_3}$ | $\epsilon_{mol}$ | $\lambda_{max}^{Gel}$ |
|---|---|---|---|---|---|---|---|---|---|---|---|
| 125 | $NHCOCH_2CH(CH_3)_2$ | $OCH_3$ | H | $CH(CH_3)CH_2OCH_3$ | $NHCOC_2H_5$ | $OC_2H_4OCH_3$ | Br | $NO_2$ | 696 | 43580 | 670 |
| 126 | $NHCOC_2H_5$ | $OC_2H_4OCH_3$ | $C_3H_7$ | $C_3H_7$ | $CH_3$ | $OCH_3$ | Br | $NO_2$ | 622 | 34840 | 635 |

Use Examples

EXAMPLE 2

0.6 mg of the dye of the formula

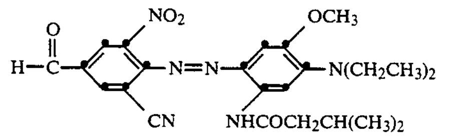

is dissolved in 2 ml of a 9:1 mixture of ethyl acetate and tricresyl phosphate, and the solution is added to a mixture of 6.6 ml of a 6% aqueous gelatin solution, 0.9 ml of distilled water and 0.5 ml of an 8% solution of sodium dibutylnaphthalenesulfonate, and emulsified therein by ultrasonics.

2.5 ml of the resulting emulsion are mixed with 5 ml of water, 2.5 ml of an unsensitised gelatin/silver bromide-iodide emulsion containing about 22 g of silver/kg of gelatin, and 1 ml of a 1% solution of a hardener of the formula

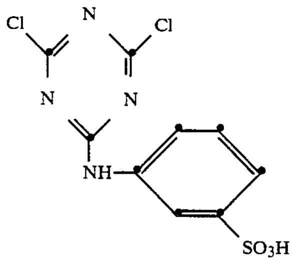

This mixture is coated on an opaque triacetate base (size 13×18 cm) and dried. The resulting light-sensitive material is exposed behind a step wedge and is processed at 24° C., as follows:

Developing 6 minutes
Washing 4 minutes
Silver bleaching and dye bleaching 6 minutes
Washing 2 minutes
Fixing 8 minutes
Washing 6 minutes
Drying The developer baths and fixing baths are conventional baths, as used in black-and-white photography. The silver dye bleach bath has the following composition per liter of solution:

Sulfamic acid 100 g
m-Nitrobenzenesulfonic acid 10 g
Potassium iodide 6 g
2,3,6-Trimethylquinoxaline 2 g
2-Mercaptobutyric acid 1 g A counter-imagewise cyan wedge, which is bleached completely white where originally the silver density was highest, is obtained. The image is distinguished by great brilliance and light-fastness.

EXAMPLE 3

25 mg of the dye of the formula

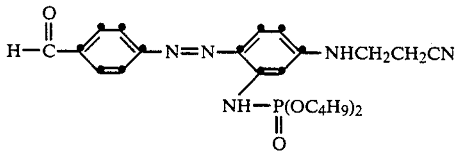

are incorporated into a light-sensitive photographic material analogously to the above example.

After exposure, the material is processed at 30° C., as follows:

Developing 3 minutes
Washing 1 minute
Silver bleaching and dye bleaching 5 minutes
Washing 1 minute
Fixing 4 minutes
Washing 6 minutes
Drying The baths used have the composition mentioned above. A brilliant, light-fast yellow wedge is obtained, which in the area of maximum silver density is bleached completely white.

EXAMPLE 4

20 mg of the dye of the formula

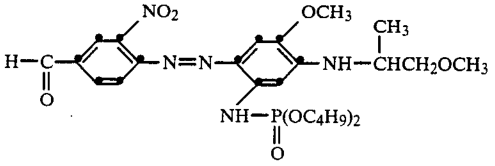

are dissolved in 2 ml of ethylene chloride and 0.2 ml of tricresyl phosphate. 7 ml of 5% gelatin solution and 0.5 ml of an 8% aqueous solution of sodium dibutylnaphthalenesulfonate are added and the mixture is emulsified until homogeneous. The dye emulsion is mixed with 7 ml of 4% gelatin solution, 16 ml of water, 3 ml of a stabilised silver halide emulsion containing 24 g of silver per kg of gelatin and 4 ml of a 1% hardener solution, and this mixture is cast on 0.1 $m^2$ of an opaque base, and dried.

A strip, cut to size 3.5×18 cm, is exposed to white light and then processed at 24° C., as follows:

Developer bath 6 minutes
Washing 4 minutes
Silver dye bleach bath 6 minutes
Washing 2 minutes
Fixing bath 8 minutes
Washing 6 minutes
Drying The developer bath used has the composition given in U.S. Pat. No. 4,141,734.

The silver dye bleach bath used is a solution which, per liter, contains the following components:

Concentrated sulfuric acid 28 ml
Sodium iodide 9 g
Disodium salt of 4-nitrophenol-2-sulfonic acid 6 g
6-Methoxy-2,3-dimethylquinoxaline 1 g
Sodium salt of bis-(2-cyanoethyl)(2-sulfoethyl)-phosphine 3 g In addition, a conventional fixing bath, containing 200 g of sodium thiosulfate per liter of solution, is used.

A brilliant, light-fast magenta wedge is obtained, which is bleached completely white in the area which originally had the greatest silver density.

The other dyes of Tables 1 and 2 can be employed analogously in photographic silver halide emulsions.

What is claimed is:

1. A photographic material which comprises on a base, at least one layer containing an azo dyestuff of the formula

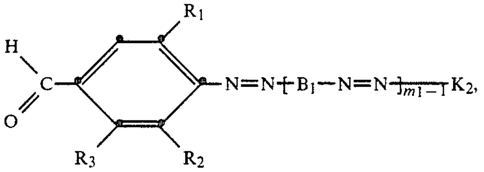
(1)

in which $R_1$ is hydrogen, alkylsulfone having 1 to 8 carbon atoms which is unsubstituted or substituted by methoxy, cyano or halogen, halogen, cyano or nitro, $R_2$ is hydrogen, halogen, cyano or nitro, $R_3$ is hydrogen, alkyl having 1 to 4 carbon atoms, halogen or nitro, $B_1$ is a phenylene, naphthalene, thiophenylene or thiazolyl ring system, $K_2$ is

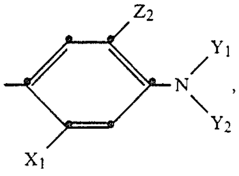
,
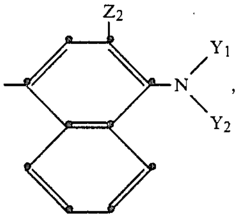
,

-continued

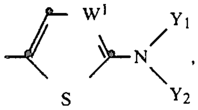
,
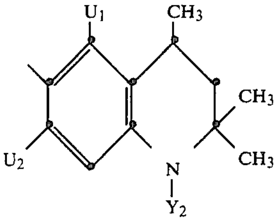
or
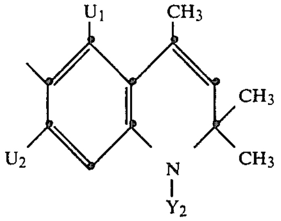

in which $U_1$ and $U_2$ are hydrogen, alkyl or alkoxy each having 1 to 4 carbon atoms, or $—NHCOA_1$, in which $A_1$ is alkyl having 1 to 4 carbon atoms or phenyl, and at least one of the substituents $U_1$ and $U_2$ must be hydrogen, $W^1$ is —CH= or —N=, $Y_1$ is hydrogen or alkyl having 1 to 5 carbon atoms, which is unsubstituted or substituted by halogen, cyano, methoxy or hydroxyl, $Y_2$ is hydrogen, alkyl having 1 to 12 carbon atoms or alkoxyalkyl having 2 to 12 carbon atoms which are unsubstituted or substituted by methoxy, chlorine, bromine, cyano or hydroxyl, alkenyl having 2 to 4 carbon atoms, benzyl or phenyl which is unsubstituted or substituted by alkyl having 1 to 5 carbon atoms, $Z_2$ is hydrogen or alkoxy having 1 to 6 carbon atoms which is unsubstituted or substituted by halogen or methoxy, or forms together with $Y_1$ a radical of the formula $—CH(CH_3)—CH_2—C(CH_3)_2—$ and $X_1$ is $—NHP(O)(OT_1)_2$, in which $T_1$ is alkyl having 1 to 8 carbon atoms which is unsubstituted or substituted by methoxy or ethoxy, benzyl or phenyl, and $m_1$ is 1 or 2.

2. A photographic material according to claim 1, wherein the azo dyestuff is of the formula

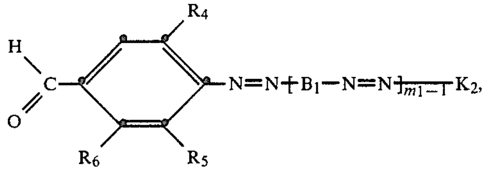
(2)

in which $R_4$ is hydrogen, alkylsulfone having 1 to 6 carbon atoms which is unsubstituted or substituted by methoxy, cyano or halogen, chlorine, bromine, cyano or nitro, $R_5$ is hydrogen, chlorine, bromine, cyano or nitro, $R_6$ is hydrogen, methyl, ethyl, chlorine, bromine or nitro and $B_1$, $K_1$ and $m_1$ are as defined in claim 1.

3. A photographic material according to claim 2, wherein the azo dyestuff is of the formula

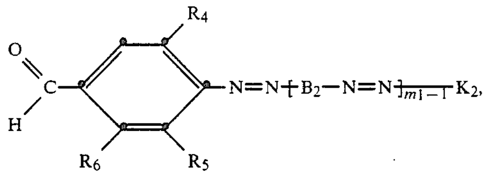
(3)

in which $B_2$ is a radical of the formula

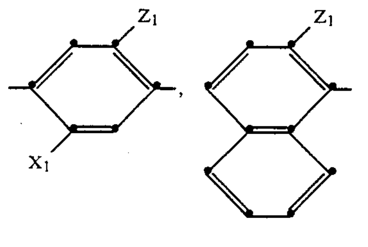

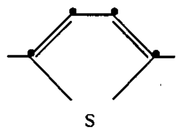

and

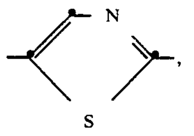

in which $X_1$ is alkyl or alkoxy, each having 1 to 6 carbon atoms and which are unsubstituted or substituted by hydroxyl, methoxy, chlorine, bromine, cyano or nitro, alkylsulfonylamino having 1 to 8 carbon atoms, or —NHCO—$V_1$, in which $V_1$ is alkyl having 1 to 14 carbon atoms which is unsubstituted or substituted by halogen, alkoxy having 1 to 4 carbon atoms, carbalkoxy having 2 to 5 carbon atoms, phenoxy, —P(O)$(OCH_3)_2$ or —P(O)$(OC_2H_5)_2$, or alkoxy having 1 to 4 carbon atoms, or $X_1$ is —NHP(O)$(OT_1)_2$, in which $T_1$ is alkyl having 1 to 8 carbon atoms which is unsubstituted or substituted by methoxy or ethoxy, benzyl or phenyl, $Z_1$ is hydrogen or alkoxy having 1 to 6 carbon atoms, $K_2$ is a radical of the formula

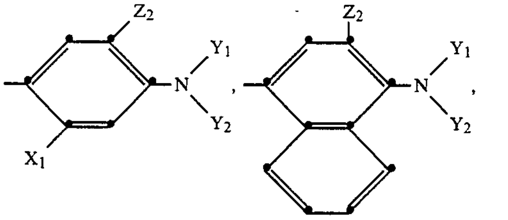

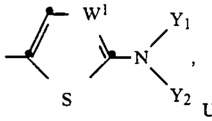

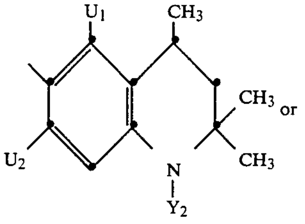

or

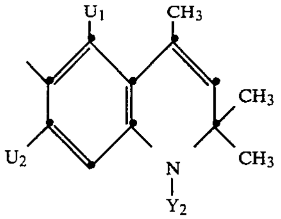

in which $U_1$ and $U_2$ are hydrogen, alkyl or alkoxy each having 1 to 4 carbon atoms, or —NHCO$A_1$, in which $A_1$ is alkyl having 1 to 4 carbon atoms or phenyl, and at least one of the substituents $U_1$ and $U_2$ must be hydrogen, $W^1$ is —CH= or —N=, $Y_1$ is hydrogen or alkyl having 1 to 5 carbon atoms, which is unsubstituted or substituted by halogen, cyano, methoxy or hydroxyl, $Y_2$ is hydrogen, alkyl having 1 to 12 carbon atoms or alkoxyalkyl having 2 to 12 carbon atoms which are unsubstituted or substituted by methoxy, chlorine, bromine, cyano or hydroxyl, alkenyl having 2 to 4 carbon atoms, benzyl or phenyl which is unsubstituted or substituted by alkyl having 1 to 5 carbon atoms, $Z_2$ is hydrogen or alkoxy having 1 to 6 carbon atoms which is unsubstituted or substituted by halogen or methoxy, or forms together with $Y_1$ a radical of the formula $—CHCH_3—CH_2—C(CH_3)_2—$ and $X_1$ is as defined above and $m_1$, $R_4$, $R_5$ and $R_6$ are as defined in claim 2.

4. A photographic material according to claim 3, wherein the azo dyestuff is of the formula

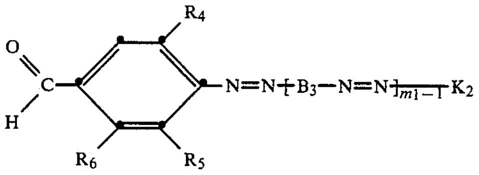

(4)

in which $B_3$ is a radical of the formula

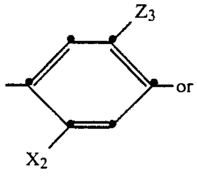

or

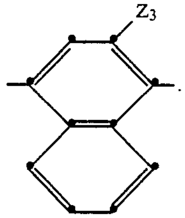

in which $X_2$ is alkyl or alkoxy, each having 1 or 2 carbon atoms, or is —NHCO$V_2$, in which $V_2$ is alkyl having 1 to 14 carbon atoms or alkoxy having 1 to 4 carbon atoms which are unsubstituted or substituted by halogen, by alkoxy having 1 to 4 carbon atoms, by —P(O)$(OC_2H_5)_2$, by carbalkoxy having 2 to 5 carbon atoms, by phenoxy or by alkyl-substituted phenoxy, alkyl having 1 to 5 carbon atoms, or $X_2$ is alkylsulfonylamino having 1 to 6 carbon atoms or is —NHP(O)$(OT_1)_2$, in which $T_1$ is as defined in claim 3, $Z_3$ is hydrogen, methoxy or ethoxy and $m_1$, $K_2$, $R_4$, $R_5$ and $R_6$ are as defined in claim 3.

5. A photographic material according to claim 4, wherein the azo dyestuff is of the formula

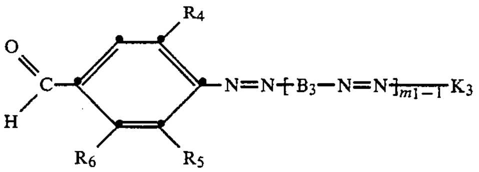

(5)

in which $K_3$ is a radical of the formula

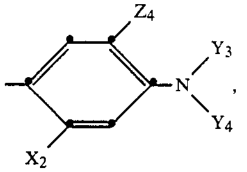

-continued

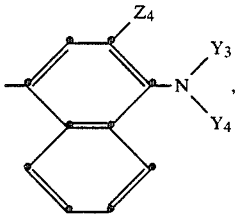

,

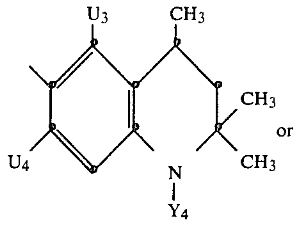

or

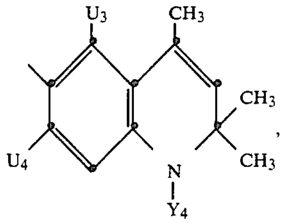

, in which $U_3$ and $U_4$ are hydrogen or —$NHCOA_2$, in which $A_2$ is alkyl having 1 to 4 carbon atoms, or are alkyl or alkoxy each having 1 to 4 carbon atoms, but at least one of the substituents $U_3$ and $U_4$ must always be hydrogen, $Y_3$ is hydrogen or alkyl having 1 to 4 carbon atoms, $Y_4$ is hydrogen, alkyl having 1 to 8 carbon atoms, alkoxyalkyl having 2 to 8 carbon atoms, benzyl or phenyl, $Z_4$ is hydrogen or alkoxy having 1 to 4 carbon atoms or forms together with $Y_3$ a radical of the formula —$CHCH_3$—$CH_2$— $C(CH_3)_2$— and $X_2$, $R_4$, $R_5$, $R_6$ and $m_1$ are as defined in claim 4.

6. A photographic material according to claim 5, wherein the azo dyestuff is of the formula

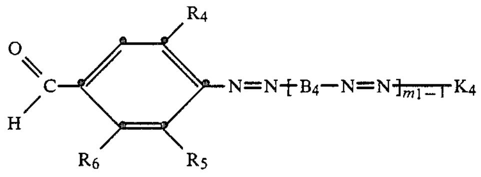

(6)

in which $B_4$ is a radical of the formula

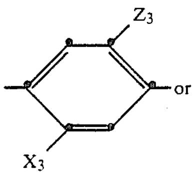

or

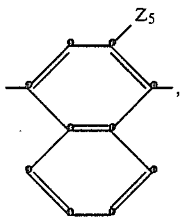

, in which $X_3$ is alkyl or alkoxy, each having 1 or 2 carbon atoms, or is —$NHCOV_3$, in which $V_3$ is alkyl having 1 to 8 carbon atoms, which is unsubstituted or substituted by fluorine, by alkoxy having 1 to 4 carbon atoms, by —$P(O)(OC_2H_5)_2$, by carbalkoxy having 2 to 5 carbon atoms, by phenoxy or by alkyl-substituted phenoxy, the alkyl moiety having 1 to 5 carbon atoms, or $X_3$ is alkylsulfonylamino having 1 to 6 carbon atoms or is —$NHP(O)(OT_2)_2$, in which $T_2$ is unsubstituted or methoxy- or ethoxy-substituted alkyl having 1 to 4 carbon atoms or is phenyl, $Z_5$ is hydrogen or methoxy, $K_4$ is a radical of the formula

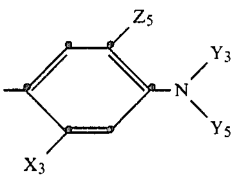

or

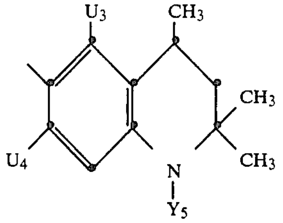

in which $Y_5$ is hydrogen, alkyl having 1 to 4 carbon atoms or alkoxyalkyl having 2 to 4 carbon atoms, $X_3$ and $Z_5$ are as defined above and $U_3$, $U_4$, $Y_3$, $R_4$, $R_5$, $R_6$ and $m_1$ are as defined in claim 5.

7. A photographic material according to claim 6, wherein the azo dyestuff is of the formula

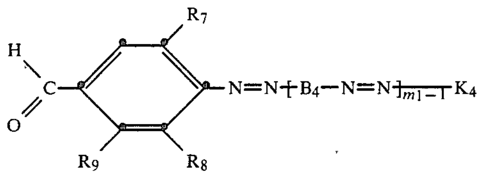

(7)

in which $R_7$ is hydrogen, alkylsulfone having 1 to 4 carbon atoms, cyano or nitro, $R_8$ is chlorine, bromine, cyano or nitro, $R_9$ is hydrogen or methyl and $B_4$, $K_4$ and $M_1$ are as defined in claim 6.

8. A photographic material according to claim 7, wherein the azo dyestuff is of the formula

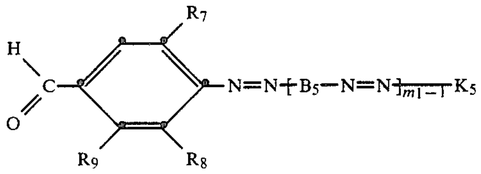

(8)

in which $B_5$ is

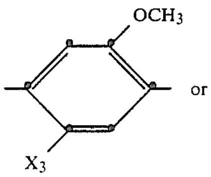

or

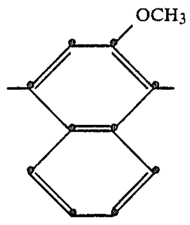

in which $X_3$ is as defined in claim 6, $K_5$ is

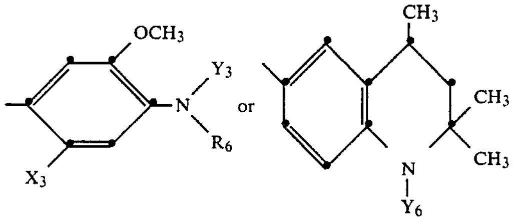

in which $Y_3$ is as defined in claim 7, $Y_6$ is hydrogen or alkyl having 1 to 4 carbon atoms, $X_3$ is as defined in claim 6 and $R_7$, $R_8$, $R_9$ and $m_1$ are as defined in claim 7.

9. A photographic material according to claim 8, wherein the azo dyestuff is of the formula

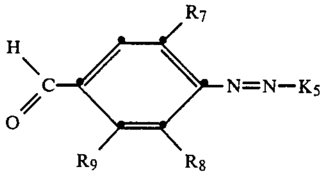

(9)

in which $R_7$, $R_8$, $R_9$ and $K_5$ are as defined in claim 8.

10. A photographic material according to claim 9, wherein the azo dyestuff is of the formula

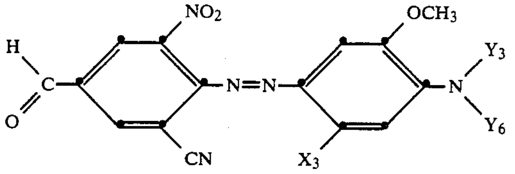

(10)

or

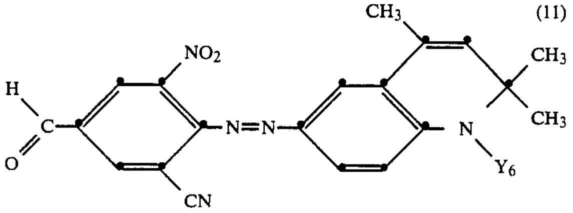

(11)

in which $X_3$, $Y_3$ and $Y_6$ are as defined in claim 9.

* * * * *

UNITED STATES PATENT AND TRADEMARK OFFICE

CERTIFICATE OF CORRECTION

PATENT NO. : 4,575,482

DATED : March 11, 1986

INVENTOR(S) : John Lenoir

It is certified that error appears in the above-identified patent and that said Letters Patent is hereby corrected as shown below:

Col. 23, line 54 Delete "$Z_3$" and insert --$Z_5$--

Signed and Sealed this

*Fifth* Day of *August 1986*

[SEAL]

*Attest:*

DONALD J. QUIGG

*Attesting Officer* *Commissioner of Patents and Trademarks*